(12) United States Patent
Xia et al.

(10) Patent No.: US 10,200,911 B2
(45) Date of Patent: Feb. 5, 2019

(54) CONTROL METHOD AND APPARATUS FOR LOAD TRANSMISSION

(71) Applicant: Huawei Technologies Co., Ltd., Shenzhen (CN)

(72) Inventors: Haitao Xia, Beijing (CN); Chunshan Xiong, Beijing (CN); Weihua Qiao, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 238 days.

(21) Appl. No.: 15/363,024

(22) Filed: Nov. 29, 2016

(65) Prior Publication Data
US 2017/0078921 A1 Mar. 16, 2017

Related U.S. Application Data

(63) Continuation of application No. PCT/CN2014/078802, filed on May 29, 2014.

(51) Int. Cl.
*H04W 28/08* (2009.01)
*H04W 28/02* (2009.01)
(Continued)

(52) U.S. Cl.
CPC ............ *H04W 28/08* (2013.01); *H04L 67/28* (2013.01); *H04L 69/16* (2013.01);
(Continued)

(58) Field of Classification Search
CPC . H04L 41/0893; H04L 47/14; H04L 41/5029; H04L 41/0896; H04L 41/5054;
(Continued)

(56) References Cited

U.S. PATENT DOCUMENTS

2011/0296006 A1\* 12/2011 Krishnaswamy ....... H04L 45/00
709/224
2015/0189539 A1 7/2015 Li et al.

FOREIGN PATENT DOCUMENTS

CN 102185771 A 9/2011
CN 103004167 A 3/2013
(Continued)

OTHER PUBLICATIONS

González, M.A.P. et al., "Radio Access Considerations for Data Offloading with Multipath TCP in Cellular/WiFi Networks," IEEE 2013 International Conference on Information Networking (ICOIN), Jan. 28-30, 2013, pp. 680-685.
(Continued)

*Primary Examiner* — Natasha W Cosme
(74) *Attorney, Agent, or Firm* — Slater Matsil, LLP

(57) ABSTRACT

A control method and apparatus for load transmission is provided. The control method includes: receiving a trigger event reported by a proxy server, where the trigger event includes a first transmission delay of a first member transmission path and a second transmission delay of a second member transmission path, and reporting the trigger event when one of the first and the second transmission delays is greater than a first delay threshold, The method also includes initiating a request to a packet data network gateway and obtaining network information fed back by the packet data network gateway. The method also includes controlling, according to the first transmission delay, the second transmission delay, and the network information, the proxy server to perform corresponding load distribution.

17 Claims, 3 Drawing Sheets

(51) Int. Cl.

| | | |
|---|---|---|
| *H04L 29/08* | (2006.01) | |
| *H04L 29/06* | (2006.01) | |
| *H04W 88/06* | (2009.01) | |
| *H04W 84/12* | (2009.01) | |
| *H04W 84/04* | (2009.01) | |
| *H04W 88/16* | (2009.01) | |

(52) U.S. Cl.
CPC ... *H04W 28/0268* (2013.01); *H04W 28/0273* (2013.01); *H04W 84/042* (2013.01); *H04W 84/12* (2013.01); *H04W 88/06* (2013.01); *H04W 88/16* (2013.01)

(58) Field of Classification Search
CPC ... H04L 47/805; H04L 47/824; H04L 47/803; H04L 47/822; H04L 47/20; H04L 47/2425; H04L 47/2475; H04L 12/1492; H04L 12/1496; H04L 41/5006; H04L 41/5022; H04L 67/16; H04L 12/1485; H04L 41/5019; H04L 43/0876; H04W 4/24; H04W 24/08; H04W 28/0268; H04W 12/08; H04W 24/00; H04W 28/0289; H04W 4/50; H04W 80/04; H04W 24/02; H04W 36/14; H04W 48/04; H04W 48/16; H04W 52/0212; H04W 52/0264; H04W 28/0284; H04W 28/20; H04W 48/06; H04W 48/02; H04W 28/24; H04W 88/06
USPC .......................................................... 370/331
See application file for complete search history.

(56) References Cited

FOREIGN PATENT DOCUMENTS

| CN | 103580773 A | 2/2014 |
|---|---|---|
| CN | 103597794 A | 2/2014 |
| CN | 103782555 A | 5/2014 |
| EP | 2892190 A1 | 7/2015 |
| WO | 2014044333 A1 | 3/2014 |

OTHER PUBLICATIONS

Ford, A., et al., "TCP Extensions for Multipath Operation with Multiple Addresses," Internet Engineering Task Force (IETF), Request for Comments 6824, Jan. 2013, pp. 1-64.
Ford, A., et al., "Architectural Guidelines for Multipath TCP Development," Internet Engineering Task Force (IETF), Request for Comments 6182, Mar. 2011, pp. 1-28.

* cited by examiner

CONTROL METHOD AND APPARATUS FOR LOAD TRANSMISSION

CROSS-REFERENCE TO RELATED APPLICATIONS

This application is a continuation of International Application No. PCT/CN2014/078802, filed on May 29, 2014, the disclosure of which is hereby incorporated by reference in its entirety.

TECHNICAL FIELD

The present invention pertains to the field of communications technologies, and specifically relates to the field of Multipath Transmission Control Protocol (MPTCP) technologies, and in particular, to a control method and apparatus for MPTCP-based load transmission.

BACKGROUND

The MPTCP is a Transmission Control Protocol (TCP) enhancement technology put forward by the Internet Engineering Task Force (IETF). The MPTCP is intended to allow multiple member transmission paths to be used in one TCP connection to transmit load of user equipment (UE), that is, a service data flow, so as to maximize utilization of a transmission resource and improve a redundant backup of the transmission resource.

Currently, the MPTCP has been applied in an application scenario in which a wireless local area network (WLAN), such as Wireless Fidelity (WiFi), and a cellular mobile network, such as 3rd-Generation (3G) or 4th-Generation (4G) interoperate with each other to ensure quality of service of communication. For example, when handing over between a WiFi network and a 4G network, user equipment uses the MPTCP to perform load control to maintain service continuity, so as to ensure service experience of a user; and the MPTCP is used to perform load sharing on a service flow of same user equipment between the WiFi network and the 4G network to ensure that the service flow of the user equipment reaches load balance between member paths of each network, so as to ensure communication transmission efficiency of each network.

In an application scenario in which multiple networks cooperate to perform multipath transmission, how to perform load control by using the MPTCP to provide good service experience for a user becomes a technical problem that needs to be urgently resolved by a communication operator. Generally, a solution provided in the prior art is to distribute load of user equipment to a network access point with a lower congestion (load) level only according to a congestion control principle, so as to improve the communication transmission efficiency.

However, in the foregoing method, only a congestion level of each member transmission path of the TCP is used as a condition for determining load distribution. Therefore, a cause of congestion that occurs on each member transmission path cannot further be determined, and a specific instruction of load distribution cannot be delivered to a congested member transmission path according to the cause. Consequently, in a scenario in which load of each member transmission path is shared, service experience of a user deteriorates.

SUMMARY

In view of this, embodiments provide a control method and apparatus for MPTCP-based load transmission, so that a congested member transmission path is more accurately instructed to perform a specific load distribution solution.

Technical solutions used in the embodiments of the present invention are as follows.

According to a first aspect, a control apparatus for load transmission is provided, where load is transmitted based on the MultiPath Transmission Control Protocol MPTCP. The control apparatus includes: a receiving module, configured to receive a trigger event reported by a proxy server, where the trigger event includes a first transmission delay of a corresponding first member transmission path when user equipment accesses to a first network, and includes a second transmission delay of a corresponding second member transmission path when the user equipment accesses to a second network, where when at least one of the first transmission delay or the second transmission delay is greater than a first delay threshold, the proxy server reports the trigger event, where the first delay threshold is a threshold value of a time required by the user equipment to perform the load transmission when the user equipment is controlled to perform offloading. The control apparatus also includes a sending module, configured to initiate a request for obtaining network information to a packet data network gateway after the receiving module receives the trigger event, where the network information includes a quality of service parameter of the first network and a quality of service parameter of the second network, where the receiving module is further configured to obtain the network information fed back by the packet data network gateway. The control apparatus also includes a processing module, configured to control, according to the first transmission delay, the second transmission delay, and the network information, the proxy server to perform corresponding load distribution.

With reference to an implementation manner of the first aspect, in a first possible implementation manner, after the processing module controls the proxy server to perform the corresponding load distribution, when transmission performance that is on the first member transmission path or the second member transmission path and that is of the load restores to a normal level, load backflow occurs; and the receiving module is further configured to receive the trigger event reported again by the proxy server, where when the first transmission delay or the second transmission delay is less than a second delay threshold, the proxy server reports the trigger event again, where the second delay threshold is a threshold value of a time required for the load transmission when the user equipment is controlled to perform the load backflow, and the second delay threshold is less than the first delay threshold.

With reference to the first possible implementation manner of the first aspect, in a second possible implementation manner, the processing module is further configured to obtain subscription information of the user equipment, and control, according to the first transmission delay, the second transmission delay, the network information, and the subscription information, the proxy server to perform the corresponding load distribution, where the subscription information includes tariffs for transmitting corresponding load on the first member transmission path and the second member transmission path when the user equipment accesses to the first network and the second network.

With reference to the first possible implementation manner of the first aspect, in a third possible implementation manner, the processing module is configured to reconfigure the quality of service parameter on the first member transmission path and quality of service parameter on the second member transmission path, that are corresponding to the user equipment, and the quality of service parameters are delivered to the packet data network gateway by the sending module to control the proxy server to perform the corresponding load distribution, where the quality of service parameter include at least one of a maximum bit rate, a guaranteed bit rate, or an access point name-aggregate maximum bit rate.

With reference to the third possible implementation manner of the first aspect, in a fourth possible implementation manner, the processing module is configured to control the proxy server to perform the corresponding load distribution in a conservative, radical, or switchable manner.

With reference to the first possible, the second possible, the third possible, or the fourth possible implementation manner of the first aspect, in a fifth possible implementation manner, the first network is a wireless local area network and includes a WiFi network, the second network is a cellular network that overlaps coverage of the first network, the cellular network includes one or any combination of a 2G network, a 3G network, or a 4G network, and the second member transmission path corresponding to the second network is a default path of the load transmission.

According to a second aspect, a control apparatus for load transmission is provided, where load is transmitted based on the MultiPath Transmission Control Protocol MPTCP. The control apparatus includes: a receiving module, configured to obtain a first transmission delay of a corresponding first member transmission path when user equipment accesses to a first network, and a second transmission delay of a corresponding second member transmission path when the user equipment accesses to a second network. The control apparatus also includes processing module, configured to monitor whether at least one of the first transmission delay or the second transmission delay is greater than a first delay threshold, where the first delay threshold is a threshold value of a time required by the user equipment to perform the load transmission when the user equipment is controlled to perform offloading; and a sending module, configured to report a trigger event to a policy and charging control entity when the processing module detects that at least one of the first transmission delay or the second transmission delay is greater than the first delay threshold, where the trigger event is used to instruct the policy and charging control entity to control, according to the first transmission delay and the second transmission delay that are included in the trigger event, and obtained network information fed back by a packet data network gateway, the processing module to perform corresponding load distribution, where the network information includes a quality of service parameter of the first network and a quality of service parameter of the second network.

With reference to an implementation manner of the second aspect, in a first possible implementation manner, after the policy and charging control entity controls performing of the corresponding load distribution, when transmission performance that is on the first member transmission path or the second member transmission path and that is of the load restores to a normal level, load backflow occurs; and the sending module is further configured to report the trigger event to the policy and charging control entity again when the processing module detects that the first transmission delay or the second transmission delay is less than a second delay threshold, where the second delay threshold is a threshold value of a time required for the load transmission when the user equipment is controlled to perform the load backflow, and the second delay threshold is less than the first delay threshold.

With reference to the first possible implementation manner of the second aspect, in a second possible implementation manner, the processing module is further configured to perform the corresponding load distribution under the control that is performed, according to the first transmission delay and the second transmission delay that are included in the trigger event, and obtained subscription information of the user equipment, and the network information, by the policy and charging control entity as instructed by the trigger event, where the subscription information includes tariffs for transmitting corresponding load on the first member transmission path and the second member transmission path when the user equipment accesses to the first network and the second network.

With reference to the implementation manner of the second aspect, in a third possible implementation manner, the processing module is configured to perform, under the control of the policy and charging control entity, the corresponding load distribution in a conservative, radical, or switchable manner.

With reference to the first possible, the second possible, or the third possible implementation manner of the second aspect, in a fourth possible implementation manner, the first network is a wireless local area network and includes a WiFi network, the second network is a cellular network that overlaps coverage of the first network, the cellular network includes any combination of a 2G network, a 3G network, or a 4G network, and the second member transmission path corresponding to the second network is a default path of the load transmission.

According to a third aspect, a control method for load transmission is provided, where load is transmitted based on the MultiPath Transmission Control Protocol MPTCP. The control method includes: receiving a trigger event reported by a proxy server, where the trigger event includes a first transmission delay of a corresponding first member transmission path when user equipment accesses to a first network, and includes a second transmission delay of a corresponding second member transmission path when the user equipment accesses to a second network, where when at least one of the first transmission delay or the second transmission delay is greater than a first delay threshold, the proxy server reports the trigger event, where the first delay threshold is a threshold value of a time required by the user equipment to perform the load transmission when the user equipment is controlled to perform offloading. The control method also includes initiating a request for obtaining network information to the packet data network gateway, and obtaining the network information fed back by the packet data network gateway, where the network information includes a quality of service parameter of the first network and a quality of service parameter of the second network. The control method also includes controlling, according to the first transmission delay, the second transmission delay, and the network information, the proxy server to perform corresponding load distribution.

With reference to an implementation manner of the third aspect, in a first possible implementation manner, after the controlling the proxy server to perform corresponding load distribution, when transmission performance that is on the first member transmission path or the second member transmission path and that is of the load restores to a normal level, load backflow occurs, and the control method further includes: receiving the trigger event reported again by the proxy server, where when the first transmission delay or the second transmission delay is less than a second delay threshold, the proxy server reports the trigger event again, where the second delay threshold is threshold value of a time required for the load transmission when the user equipment is controlled to perform the load backflow, and the second delay threshold is less than the first delay threshold.

With reference to the first possible implementation manner of the third aspect, in a second possible implementation manner, the control method further includes: obtaining subscription information of the user equipment, where the subscription information includes tariffs for transmitting corresponding load on the first member transmission path and the second member transmission path when the user equipment accesses to the first network and the second network; and a step of the controlling, according to the first transmission delay, the second transmission delay, and the network information, the proxy server to perform corresponding load distribution further includes: controlling, according to the first transmission delay, the second transmission delay, the network information, and the subscription information, the proxy server to perform the corresponding load distribution.

With reference to the implementation manner of the third aspect, in a third possible implementation manner, a step of the controlling the proxy server to perform corresponding load distribution includes: reconfiguring the quality of service parameter on the first member transmission path and the quality of service parameter on the second member transmission path, that are corresponding to the user equipment, and delivering the quality of service parameters to the packet data network gateway, where the quality of service parameter include at least one of a maximum bit rate, a guaranteed bit rate, or an access point name-aggregate maximum bit rate.

With reference to the third possible implementation manner of the third aspect, in a fourth possible implementation manner, a step of the controlling the proxy server to perform corresponding load distribution further includes: controlling the proxy server to perform the corresponding load distribution in a conservative, radical, or switchable manner.

With reference to the first possible, the second possible, the third possible, or the fourth possible implementation manner of the third aspect, in a fifth possible implementation manner, the first network is a wireless local area network and includes a WiFi network, the second network is a cellular network that overlaps coverage of the first network, the cellular network includes one or any combination of a 2G network, a 3G network, or a 4G network, and the second member transmission path corresponding to the second network is a default path of the load transmission.

According to a fourth aspect, a control method for load transmission is provided, where load is transmitted based on the MultiPath Transmission Control Protocol MPTCP. The control method includes: obtaining a first transmission delay of a corresponding first member transmission path when user equipment accesses to a first network, and a second transmission delay of a corresponding second member transmission path when the user equipment accesses to a second network. The control method also includes reporting a trigger event to a policy and charging control entity if at least one of the first transmission delay or the second transmission delay is greater than a first delay threshold, where the trigger event is used to instruct the policy and charging control entity to control, according to the first transmission delay and the second transmission delay that are included in the trigger event, and obtained network information fed back by a packet data network gateway, performing of corresponding load distribution, where the first delay threshold is a threshold value of a time required by the user equipment to perform the load transmission when the user equipment is controlled to perform offloading, and the network information includes a quality of service parameter of the first network and a quality of service parameter of the second network.

With reference to an implementation manner of the fourth aspect, in a first possible implementation manner, after the policy and charging control entity controls performing of the corresponding load distribution, when transmission performance that is on the first member transmission path or the second member transmission path and that is of the load restores to a normal level, load backflow occurs, and the control method further includes: reporting the trigger event to the policy and charging control entity again if the first transmission delay or the second transmission delay is less than a second delay threshold, where the second delay threshold is a threshold value of a time required for the load transmission when the user equipment is controlled to perform the load backflow, and the second delay threshold is less than the first delay threshold.

With reference to the first possible implementation manner of the fourth aspect, in a second possible implementation manner, after a step of reporting a trigger event to a policy and charging control entity, the control method further includes: instructing, by using the trigger event, the policy and charging control entity to control, according to the first transmission delay and the second transmission delay that are included in the trigger event, and obtained subscription information of the user equipment, and the network information, performing of the corresponding load distribution, where the subscription information includes tariffs for transmitting corresponding load on the first member transmission path and the second member transmission path when the user equipment accesses to the first network and the second network.

With reference to the implementation manner of the fourth aspect, in a third possible implementation manner, a step of the controlling performing of corresponding load distribution includes: performing the corresponding load distribution in a conservative, radical, or switchable manner.

With reference to the first possible, the second possible, or third possible implementation manner of the fourth aspect, in a fourth possible implementation manner, the first network is a wireless local area network and includes a WiFi network, the second network is a cellular network that overlaps coverage of the first network, the cellular network includes any combination of a 2G network, a 3G network, or a 4G network, and the second member transmission path corresponding to the second network is a default path of the load transmission.

By using the foregoing technical solutions, a technical effect delivered by the embodiments of the present invention is: according to some embodiments, a transmission delay of user equipment on each member transmission path is monitored, so that network information of a network to which each member transmission path is connected may be taken into consideration when a transmission delay is greater than a preset transmission delay threshold, so as to easily determine a cause of deterioration of transmission performance of a congested member transmission path, and instruct the congested member transmission path to execute a specific load distribution solution. Compared with the prior art, a determined load distribution solution for the congested member transmission path is more targeted and more accurate, which can greatly improve service experience of a user.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
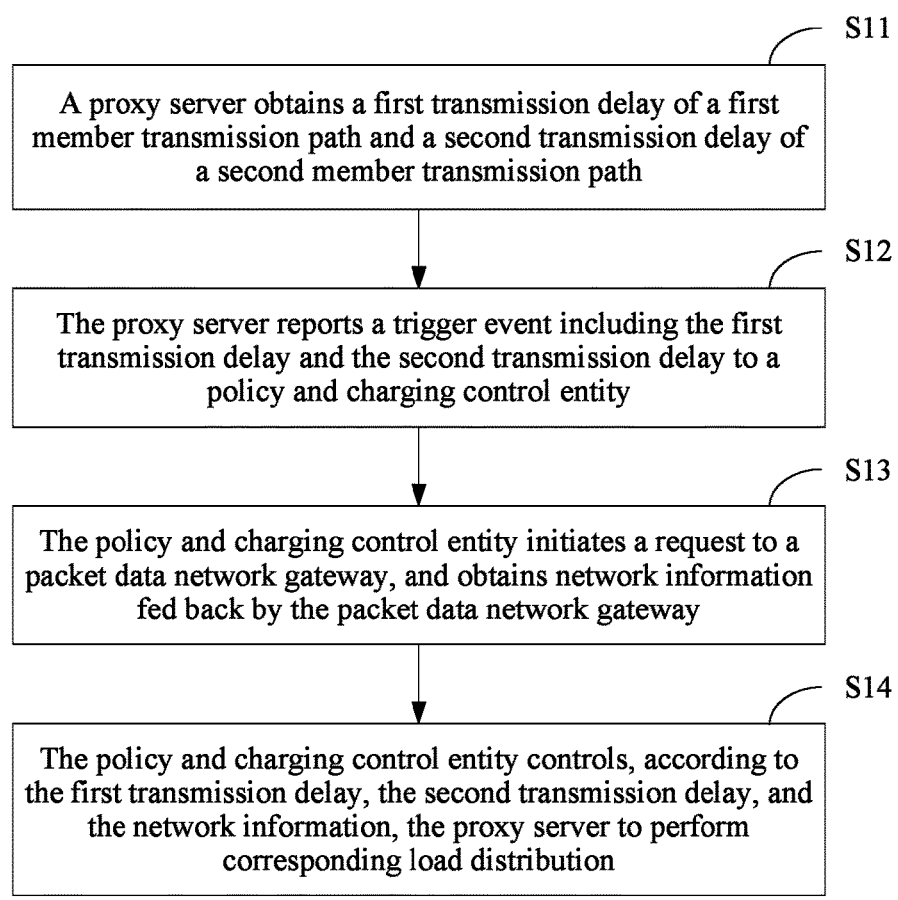
FIG. 1 is a flowchart of a control method for MPTCP-based load transmission according to a first embodiment of the present invention.
Figure 2:
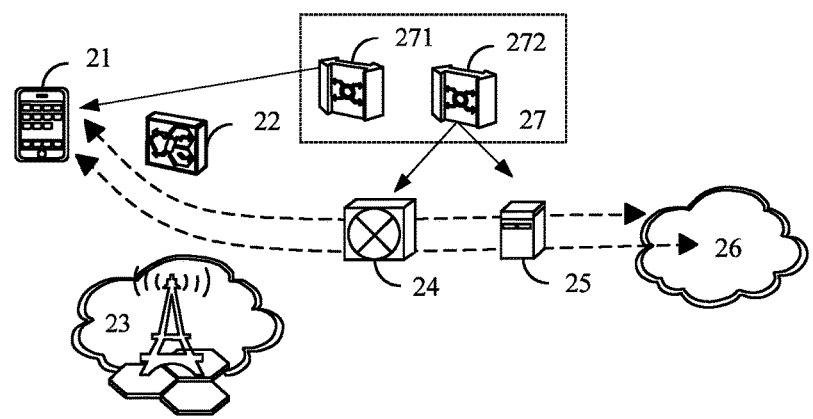
FIG. 2 is a schematic diagram of an MPTCP-based multipath transmission scenario according to a exemplary embodiment of the present invention.

The embodiments of the present invention first provide a control method for load transmission that is shown in FIG. 1, and the control method is based on an MPTCP-based multipath transmission scenario shown in FIG. 2. In the embodiments of the present invention, control of the load transmission is essentially load sharing, in which a transmission delay that is of user equipment and that is on each member transmission path is monitored, and in addition, network information of a network to which each member transmission path is connected is taken into consideration, so as to easily determine a cause of deterioration of a congested member transmission path, and determine a more targeted load distribution solution, and instruct the congested member transmission path to execute the determined solution of the load distribution to distribute a service data flow of the user equipment to each member transmission path, which is highly accurate and can greatly improve service experience of a user.

Referring to FIG. 2, a policy and charging control (PCC) architecture is introduced in this multipath transmission scenario, which includes user equipment 21, a first network access point 22, a second network access point 23, a packet data network gateway (PGW) 24, a proxy server (MPTCP Proxy) 25, a web server 26, and a policy and charging control entity 27. The policy and charging control entity 27 includes a first function entity 271 and a second function entity 272. The first function entity 271 is essentially an access network discovery and selection function (ANDSF) entity, which is configured to perform transmission path access control on the user equipment 21 by using an S14 reference point; and the second function entity 272 is essentially a policy and charging rule function (PCRF) entity, which is configured to perform offloading control on multiple member transmission paths according to subscription information of the user and by using a newly defined reference point that is similar to a Gx or an Sd, where the subscription information includes tariffs for transmitting load of the user equipment 21 on all member transmission paths, so as to implement backup guarantee transmission and load distribution transmission that are of load of a same user equipment 21 and that are in different access networks.

In this multipath transmission scenario, a first member transmission path is: the first network access point 22-the PGW 24-the proxy server 25-the web server 26, and a second member transmission path is: the second network access point 23-the PGW 24-the proxy server 25-the web server 26. The user equipment 21 accesses to the first member transmission path by using the first network access point 22, and accesses to the second member transmission path by using the second network access point 23. In this embodiment, preferably, the first network access point 22 is a network access point (AP) of a WiFi network, and the second network access point 23 is a NodeB eNodeB of a 4G network (a cellular network). Correspondingly, a first network is the WiFi network, a second network is the 4G network, the first member transmission path is a WiFi path, and the second member transmission path is a 4G path. In addition, based on service continuity of network browsing during a movement process of the user equipment 21, preferably, a 4G path is selected as a default path for load transmission, that is, a default path.

Load of the user equipment 21 that passes through the WiFi network is first aggregated to the proxy server 25, and then is transferred to the web server 26. The proxy server 25 is an agent entity of the web server 26. For a web server 26 that does not support an MPTCP function, preferably, an SGi interface is used in this embodiment to perform multipath transmission adaption (assembly or distribution) on uplink and downlink load, but no change is made on the web server 26. The proxy server 25 and the PGW 24 may be in a same physical entity (for example, a function of an MPTCP proxy server is inserted into a PGW device as a software module), or may be physical entities independent of each other.

In addition, the policy and charging control entity 27 (corresponding to the first function entity 271 and the second function entity 272) integrates a PCRF function and an ANDSF function. The first function entity 271 and the second function entity 272 may be in a same physical entity, or may be physical entities that are disposed separately and independently. When the first function entity 271 and the second function entity 272 are disposed separately, a private interface is disposed between the first function entity 271 and the second function entity 272.

It should be understood that the foregoing MPTCP-based multipath transmission scenario, and entity elements and access nodes that are included in each member transmission path are only used as an example for description. In the present invention, member transmission paths of any quantity that are under a same TCP connection and that are of the user equipment 21 may be set according to a network planning feature in an actual application scenario, and are not limited to the WiFi path and 4G path in the foregoing example. For example, the member transmission paths may be set to be a 3G path, a 4G path, or multiple WiFi paths.

Correspondingly, types of the entity elements and the access nodes that are included in each member transmission path may be correspondingly adjusted according to actual application.

An MPTCP connection between the user equipment 21 and the proxy server 25 may be an IP-CAN (IP Connection Access Network) session between the user equipment 21 and the PGW 24. That is, routes of the MPTCP connection of the user equipment 21 are all distributed to a same PGW 24; on different member transmission paths, the user equipment 21 uses different IP addresses to perform interaction with the same PGW 24. Certainly, the MPTCP connection between the user equipment 21 and the proxy server 25 may be corresponding to multiple IP-CAN (IP Connection Access Network) sessions between the user equipment 21 and the PGW 24. That is, the routes of the MPTCP connection of the user equipment 21 are distributed to different PGWs 24, and are then aggregated to a same proxy server 25 by using different PGWs 24; on different member transmission paths, the user equipment 21 uses different IP addresses (for example, an IPv4 address and an IPv6 address) to perform interaction with PGWs 24 in networks of different member transmission paths.

FIG. 1 is a flowchart of a control method for MPTCP-based load transmission of a first embodiment based on the multipath transmission scenario shown in FIG. 2 according to the present invention. With reference to FIG. 1 and FIG. 2, the control method for load transmission in this embodiment includes the following steps.

Step S11: A proxy server 25 obtains a first transmission delay of a corresponding first member transmission path when user equipment 21 accesses to a first network, and a second transmission delay of a corresponding second member transmission path when the user equipment 21 accesses to a second network.

The first transmission delay and the second transmission delay refer to a time that is required from sending a request data packet to receiving an acknowledge (Ack) packet of the data packet and that is monitored on a corresponding member transmission path by the MPTCP proxy server 25. In this embodiment, a statistical result obtained, in a preset time period, by the MPTCP proxy server 25 by monitoring a transmission delay of the data packet for many times is preferred, that is, the first transmission delay is an average transmission delay or a maximum transmission delay that is of the first member transmission path and that is in the preset time period when the user equipment 21 accesses to the first network, and the second transmission delay is an average transmission delay or a maximum transmission delay that is of the second member transmission path and that is in the preset time period when the user equipment 21 accesses to the second network. Throughout the present invention, that the first transmission delay and the second transmission delay are average transmission delays that are respectively corresponding to the first member transmission path and the second member transmission path that are of a same user equipment 21 is used as an example for description.

Step S12: The proxy server 25 reports a trigger event including the first transmission delay and the second transmission delay to a policy and charging control entity 27.

If at least one of the first transmission delay or the second transmission delay is greater than a first delay threshold, for example, the first transmission delay is greater than the first delay threshold, it indicates that transmission performance of the first member transmission path deteriorates, and load distribution needs to be performed again on the first member transmission path to improve the transmission performance of the first member transmission path; or if the second transmission delay is greater than the first delay threshold, it indicates that transmission performance of the second member transmission path deteriorates, and the load distribution needs to be performed again on the second member transmission path to improve the transmission performance of the second member transmission path. In this embodiment, the first delay threshold is a threshold value of a time required by the user equipment 21 to perform the load transmission when the user equipment 21 is controlled to perform offloading.

Step S13: The policy and charging control entity 27 initiates a request for obtaining network information to a packet data network gateway PGW 24, and obtains network information fed back by the packet data network gateway PGW 24.

The trigger event is used to instruct the policy and charging control entity 27 to initiate the request to the packet data network gateway PGW 24, and obtain the network information fed back by the packet data network gateway PGW 24. The network information in this embodiment includes a quality of service parameter (QoS) of the first network and a quality of service parameter of the second network, and the quality of service parameter include at least one of a maximum bit rate (MBR), a guaranteed bit rate (GBR), or an access point name-aggregate maximum bit rate (APN-AMBR). Certainly, based on that a purpose of this step is to analyze a cause of deterioration of the transmission performance of the member transmission path when a transmission delay threshold is greater than the first delay threshold, network information may further be set in another embodiment, including one or more of: a change event of the quality of service parameters (QoS_Change) that are of the first network and/or second network that are connected to the user equipment 21, a type of a radio access technology (RAT), access network information (Access Network Information, ANI) corresponding to the user equipment 21, a congestion status of an access network that is corresponding to the user equipment 21, and a cause of releasing a connection of a radio access network (RAN)/non-access stratum (NAS).

Step S14: The policy and charging control entity 27 controls, according to the first transmission delay, the second transmission delay, and the network information, the proxy server 25 to perform corresponding load distribution.

Considering that the network information in this embodiment includes the quality of service parameter of the first network and the quality of service parameter of the second network, a load transmission solution for the user equipment 21 is therefore determined, and specifically: the policy and charging control entity 27 reconfigures quality of service parameters that are of the user equipment 21 and that are on the first member transmission path and the second member transmission path, that is, the policy and charging control entity 27 reconfigures a maximum bit rate MBR, a guaranteed bit rate GBR, or an access point name-aggregate maximum bit rate APN-AMBR that are on the first member transmission path and the second member transmission path by combining the network information, which are delivered to the packet data network gateway PGW 24 and take effect. An example is provided below.

The second transmission delay is greater than the first delay threshold, and a guaranteed bit rate GBR of a quality of service (QoS) parameter (network information) that is of the user equipment 21 and that is on the second member transmission path falls below a preset bit rate threshold, that is, when a change event of the quality of service that is of the second network to which the user equipment 21 is connected is lower than the preset bit rate threshold, a load distribution solution determined by the policy and charging control entity 27 is: reduce a guaranteed bit rate GBR of a quality of service parameter that is on the first member transmission path, and increase the guaranteed bit rate GBR of the quality of service parameter that is on the second member transmission path. Then the policy and charging control entity 27 controls the proxy server 25 to perform, according to a determined guaranteed bit rate GBR of a quality of service parameter, load transmission.

In this embodiment, preferably, the policy and charging control entity 27 controls the proxy server 25 to perform, in a conservative, radical, or switchable manner, the load distribution to implement balance of transmission performance of all member transmission paths. Specifically, the proxy server 25 performs a corresponding load distribution operation according to an instruction sent by the policy and charging control entity 27. For example, if the transmission performance of the second member transmission path of the user equipment 21 deteriorates, for conservative load distribution, the proxy server 25 progressively decreases a size of a sending sliding window of the second member transmission path in a relatively small step length, and increases the guaranteed bit rate GBR of the quality of service parameter that is of the second member transmission path to a bit rate threshold in a relatively small step length; and in addition, progressively increases a size of a sending sliding window of the first member transmission path in a same preset step length, and progressively decreases the guaranteed bit rate GBR of the quality of service parameter that is of the first member transmission path in the same preset step length. For radical load distribution, the proxy server 25 progressively decreases the size of the sending sliding window of the second member transmission path in a relatively large step length, and increases the guaranteed bit rate GBR of the quality of service parameter that is of the second member transmission path to the bit rate threshold in a relatively large step length; and in addition, progressively increases the size of the sending sliding window of the first member transmission path in the same preset step length, and progressively decreases the guaranteed bit rate GBR of the quality of service parameter that is of the first member transmission path in the same preset step length. For switchable load distribution, the proxy server 25 directly decreases the size of the sending sliding window of the second member transmission path to zero, so as to directly increase the guaranteed bit rate GBR of the quality of service parameter that is of the second member transmission path to the bit rate threshold, and in addition, adjusts the size of the sending sliding window of the first member transmission path to a maximum applicable size, so as to directly decrease the guaranteed bit rate GBR of the quality of service parameter that is of the first member transmission path, so that transmission performance of both the first member transmission path and the second member transmission path is balanced.

It should be understood that in another embodiment, a person skilled in the art may perform load distribution in another manner according to an actual requirement. Based on the foregoing description, it can be learned that, in this embodiment, a transmission delay on each member transmission path is monitored, so that network information of a network to which each member transmission path is connected may be taken into consideration when a transmission delay on a member transmission path is greater than a preset transmission delay threshold, so as to easily determine a cause of deterioration of transmission performance of a congested member transmission path, and instruct the congested member transmission path to execute a specific load distribution solution. Compared with the prior art, a determined load distribution solution for the congested member transmission path is more targeted, more accurate, and can be used to perform load distribution effectively and in a timely manner, which can greatly improve service experience of a user.

The embodiments of the present invention further provide a control method for load transmission of a second embodiment, which is described based on the control method disclosed in the first embodiment. Referring to FIG. 2 again, considering that the load transmission not only includes that load of user equipment 21 is offloaded to another member transmission path when transmission performance of a member transmission path deteriorates (as described in the first embodiment), but also includes load backflow, that is, the load of the user equipment 21 is flowed back to the member transmission path when the transmission performance of the member transmission path restores to a normal level. Differences between this embodiment and the first embodiment lie in the following.

In this embodiment, after offloading is performed on the first member transmission path shown in FIG. 2 because of overload, that is, after a new load distribution solution that is on the first member transmission path and that is for the user equipment 21 is determined and takes effect, the proxy server 25 continues to monitor a first transmission delay corresponding to the first member transmission path, and the first transmission delay herein refers to a time that is required from sending a request data packet to receiving an acknowledge (Ack) packet of the data packet and that is monitored on the first member transmission path by the proxy server 25.

Based on the description of step S12 in the first embodiment, if the first transmission delay is less than a second delay threshold, the proxy server 25 reports a trigger event that includes the first transmission delay and a second transmission delay again. In this embodiment, the second delay threshold is a threshold value of a time required for the load transmission when the user equipment 21 is controlled to perform load backflow, and the second delay threshold is less than the first delay threshold.

Likewise, after offloading is performed on the second member transmission path shown in FIG. 2 because of overload, when transmission performance that is of load and that is on the second member transmission path restores to a normal level, load backflow occurs, and the proxy server 25 continues to monitor a second transmission delay corresponding to the second member transmission path, where the second transmission delay herein refers to a time that is required from sending a request data packet to receiving an acknowledge packet of the data packet and that is monitored on the second member transmission path by the proxy server 25. If the second transmission delay is less than the second delay threshold, the proxy server 25 reports the trigger event including the second transmission delay and the first transmission delay.

Based on a beneficial effect of the first embodiment, in this embodiment, it may be avoided that load transmitted on one of the member transmission paths is extremely low, while transmission load on another member transmission path is relatively large without affecting occurrence of offloading. Load is flowed back to the member transmission path with extremely low transmission load, so that load transmitted on each member transmission path is balanced, and better transmission performance of each member transmission path is ensured.

The embodiments of the present invention further provide a control method for load transmission of a third embodiment, which is described based on the control method disclosed in the first embodiment. Differences between this embodiment and the first embodiment are as follows.

In this embodiment, the policy and charging control entity 27 further obtains subscription information of the user equipment 21, and preferably, the subscription information includes tariffs for transmitting corresponding load on all member transmission paths when the user equipment 21 accesses to the first network and the second network, and certainly, may further include a user service type corresponding to the user equipment 21, that is, a service class of a user, such as a VIP customer or a gold/silver/bronze user.

It should be noted that there is no logical relationship between the step of obtaining the subscription information in this embodiment and step S13 of obtaining the network information in the first embodiment; step S13 may be performed before the step of obtaining the subscription information, or the step of obtaining the subscription information may be performed before step S13, or even the two steps may be performed at the same time, which is not limited in this embodiment.

In step S14, the policy and charging control entity 27 controls, according to the first transmission delay, the second transmission delay, the network information, and the subscription information, the proxy server 25 to perform corresponding load distribution. For example:

The user service type is the gold user. When the second transmission delay is greater than the first delay threshold, and congestion occurs on the second member transmission path, and a guaranteed bit rate GBR of a quality of service parameter (network information) that is of the user equipment 21 and that is on the second member transmission path falls below a preset bit rate threshold, the policy and charging control entity 27 controls the proxy server 25 to progressively decrease a size of a sending sliding window of the second member transmission path in a relative large step length, and progressively increase the guaranteed bit rate GBR of the quality of service parameter that is of the second member transmission path to the bit rate threshold in a relatively large step length; and in addition, progressively increase a size of a sending sliding window of the first member transmission path in a same preset step length, and progressively decrease a guaranteed bit rate GBR of a quality of service parameter that is of the first member transmission path in the same preset step length.

The user service type is the bronze user. When the second transmission delay is greater than the first delay threshold, and slight congestion occurs on the second member transmission path, and the guaranteed bit rate GBR of the quality of service parameter (network information) that is of the user equipment 21 and that is on the second member transmission path slightly decreases (the guaranteed bit rate is still higher than the preset bit rate threshold), the policy and charging control entity 27 controls the proxy server 25 to progressively decrease the sending sliding window of the second member transmission path in a relatively small step length, and progressively increase the guaranteed bit rate GBR of the quality of service parameter that is on the second member transmission path to the bit rate threshold in a relatively small step length; and in addition, progressively increase the size of the sending sliding window of the first member transmission path in the same preset step length, and progressively decrease the guaranteed bit rate GBR of the quality of service parameter that is of the first member transmission path in the same preset step length.

Based on this, it can be learned that in this embodiment, a transmission delay on each transmission path is monitored to ensure communication quality, and subscription information of a network that is corresponding to a user and each member transmission path is taken into consideration to ensure a communication cost, so as to minimize a cost of load transmission of each member transmission path with desired communication quality, and an example that a 4G network (with a relatively high transmission tariff) is shared by using the WiFi network (with a relatively low transmission tariff) is implemented, which saves money for a user and further improves loyalty of the user in camping on a network.

Figure 3:
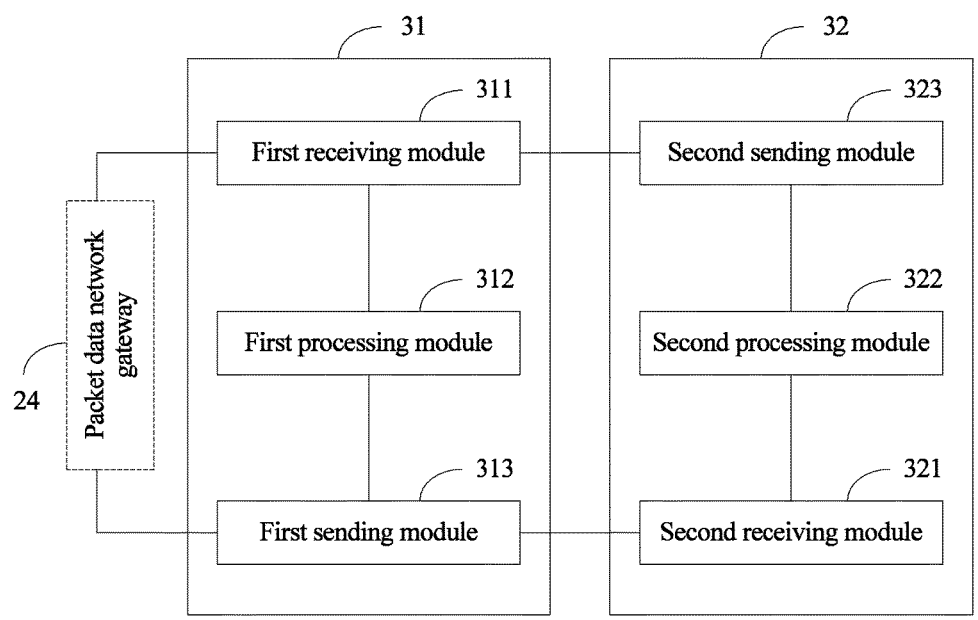
FIG. 3 is a functional block diagram of a policy and charging control entity and a proxy server that are in a control apparatus for MPTCP-based load transmission according to a preferred embodiment of the present invention.

The embodiments of the present invention further provide a control apparatus for load transmission that is shown in FIG. 3, which may be applied in the MPTCP-based multi-path transmission scenario shown in FIG. 2. With reference to FIG. 2 and FIG. 3, the control apparatus in this embodiment includes a policy and charging control entity 31 and a proxy server 32. The policy and the charging control entity 31 includes a first receiving module 311, a first processing module 312, and a first sending module 313; and the proxy server 32 includes a second receiving module 321, a second processing module 322, and a second sending module 323.

The second receiving module 321 is configured to obtain a first transmission delay of a corresponding first member transmission path when user equipment 21 accesses to a first network, and a second transmission delay of a corresponding second member transmission path when the user equipment 21 accesses to a second network.

The second processing module 322 is configured to monitor whether at least one of the first transmission delay or the second transmission delay is greater than the first delay threshold, where the first delay threshold is a threshold value of a time required for the load transmission when the user equipment 21 is controlled to perform offloading. When the second processing module 322 detects that one of the first transmission delay or the second transmission delay is greater than the first delay threshold. The second sending module 323 is configured to report a trigger event to the policy and charging control entity 31 under the control of the second processing module 322. Correspondingly, the first receiving module 311 of the policy and charging control entity 31 is configured to receive the trigger event reported by the second sending module 323. The trigger event includes the first transmission delay and the second transmission delay.

The first sending module 313 is configured to initiate a request to a packet data network gateway PGW 24 under the control of the first processing module 312 after the first receiving module 311 receives the trigger event.

The first receiving module 311 is further configured to obtain network information fed back by the packet data network gateway PGW 24; and the first processing module 312 is configured to determine a load transmission solution for the user equipment 21 according to the first transmission delay, the second transmission delay, and the network information, and control the first sending module 311 to send the load transmission solution to the proxy server 32. Correspondingly, the second receiving module 321 of the proxy server 32 is configured to receive the load transmission solution sent by the first sending module 311, so that the second processing module 322 may perform corresponding load distribution.

The network information in this embodiment includes a quality of service parameter of the first network and a QoS of the second network, and the quality of service parameter include at least one of a maximum bit rate MBR, a guaranteed bit rate GBR, or an access point name-aggregate maximum bit rate APN-AMBR. Certainly, network information may further be set in another embodiment, including one or more of: a change event of the quality of service parameters_Change that are of the first network and/or the second network to which the user equipment 21 is connected, a type of a radio access technology RAT, access network information ANI corresponding to the user equipment 21, a congestion status of an access network that is corresponding to the user equipment 21, and a cause of release of a connection of a radio access network RAN/non-access stratum NAS.

Considering that the network information in this embodiment includes the quality of service parameter that are of the first network and the QoS that are of the second network, a load transmission solution for the user equipment 21 is therefore determined by the first processing module 312 of the policy and charging control entity 31, and specifically: the first processing module 312 reconfigures the quality of service parameters that are of the user equipment 21 and that are on the first member transmission path and the second member transmission path, that is, the first processing module 312 reconfigures a maximum bit rate MBR, a guaranteed bit rate GBR, or an access point name-aggregate maximum bit rate APN-AMBR that are on the first member transmission path and the second member transmission path by combining the network information, which are delivered to the packet data network gateway PGW 24 and take effect.

In this embodiment, preferably, the second processing module 322 of the proxy server 32 performs the load distribution in a conservative, radical, or switchable manner to implement balance of transmission performance of all member transmission paths. For processes of determining and executing the load distribution solution, refer to the description of the control method of the load transmission in the foregoing first embodiment, and details are not described herein again. In another embodiment, the second processing module 322 may further perform the load distribution in another manner.

After the first processing module 312 controls the second processing module 322 of the proxy server 32 to perform the corresponding load distribution, when transmission performance that is of the load and that is on the first member transmission path or the second member transmission path restores to a normal level, load backflow occurs. The first receiving module 311 is further configured to receive the trigger event reported again by the second sending module 323 of the proxy server 32, where when the first transmission delay or the second transmission delay is less than a second delay threshold, the second sending module 323 reports the trigger event again, where the second delay threshold is a threshold value of a time required for the load transmission when the user equipment 21 is controlled to perform load backflow, and the second delay threshold is less than the first delay threshold.

Further, the first receiving module 311 is further configured to obtain subscription information of the user equipment 21; and the first processing module 312 is further configured to determine a load transmission solution for the user equipment 21 according to the first transmission delay, the second transmission delay, the network information, and the subscription information, so as to control the second processing module 322 of the proxy server 32 to perform the corresponding load distribution. Preferably, the subscription information includes transmission tariffs for transmitting corresponding load on all member transmission paths when the user equipment 21 accesses to the first network and the second network, and certainly may further include a user service type corresponding to the user equipment 21, that is, a service class of a user, such as a VIP customer or a gold/silver/bronze user.

In this embodiment, the policy and charging control entity 31 and the proxy server 32 in the description of the control apparatus of the load transmission are corresponding to the control methods of the load transmission that are in the first embodiment, the second embodiment, and the third embodiment, and therefore have same technical effects as the control methods of the load transmission.

It should be understood that implementation manners of the policy and charging control entity 31 and the proxy server 32 are merely exemplary. The module division is merely division of logical functions, and may be division in another manner in actual implementation. For example, multiple modules may be integrated into another system, or some features may be ignored or not performed; some or all of the modules may be selected according to actual requirements to achieve the objectives of the solutions of the present invention. In addition, coupling or a communications connection between modules may be implemented by using some interfaces or be implemented in an electronic form or another form.

Figure 4:
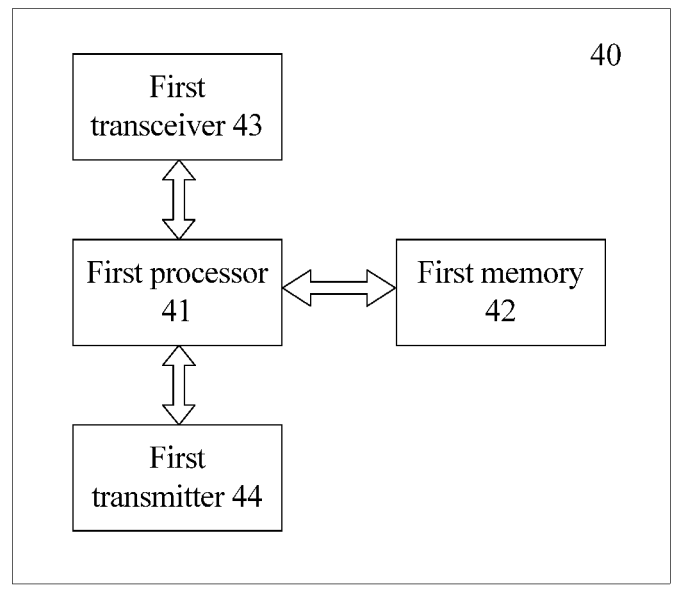
FIG. 4 is a schematic structural diagram of hardware of a policy and charging control entity in a control apparatus for MPTCP-based load transmission according to a preferred embodiment of the present invention.
Figure 5:
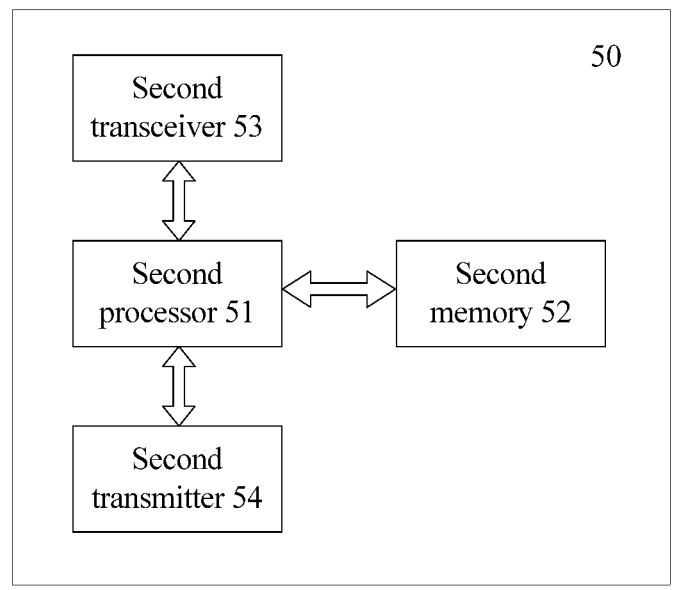
FIG. 5 is a schematic structural diagram of hardware of a proxy server in a control apparatus for MPTCP-based load transmission according to a preferred embodiment of the present invention.

As components of the policy and charging control entity 31 and the proxy server 32, the foregoing functional modules may or may not be physical blocks, and may be implemented in a form of a software functional block, or may be implemented in a hardware form, for example, as shown in FIG. 4 and FIG. 5.

FIG. 4 is a schematic structural diagram of hardware of a policy and charging control entity according to a preferred embodiment of the present invention. Referring to FIG. 4, a policy and charging control entity 40 in this embodiment applies to the application scenario shown in FIG. 2. The policy and charging control entity 40 includes a first processor 41, a first memory 42, a first receiver 43, and a first transmitter 44, where the first memory 42, the first receiver 43, and the first transmitter 44 are connected to the first processor 41. The first receiver 43 is configured to receive a trigger event reported by a proxy server 25, and the first transmitter 44 is configured to initiate a request for obtaining network information to a packet data network gateway PGW 24, and forward a control instruction of the first processor 41 to the proxy server 25. The trigger event includes a first transmission delay of a corresponding first member transmission path when user equipment 21 accesses to a first network, and includes a second transmission delay of a corresponding second member transmission path when the user equipment 21 accesses to a second network. When at least one of the first transmission delay or the second transmission delay is greater than a first delay threshold, the proxy server 25 reports the trigger event, where the first delay threshold is a threshold value of a time required by the user equipment 21 to perform the load transmission when the user equipment 21 is controlled to perform offloading.

The first memory 42 may be one or more of: a floppy disk, a USB flash drive, a removable hard disk, a read-only memory (ROM), a random access memory (RAM), a magnetic disk, or an optical disc of a computer. The first memory 42 further stores an application program, which is configured for invocation by the first processor 41 to implement load distribution.

By invoking the application program stored in the first memory 42, the first processor 41 executes the following operations: control the first transmitter 44 to initiate the request for obtaining the network information to the packet data network gateway PGW 24, and control the first receiver 43 to receive network information fed back by the packet data network gateway PGW 24, where the network information in this embodiment includes a quality of service parameter that is of the first network and a quality of service parameter that is of the second network; and then determine a load distribution solution according to the first transmission delay, the second transmission delay, and the network information, and control the first transmitter 44 to deliver a control instruction to the proxy server 25 to control the proxy server 25 to perform corresponding load distribution.

In addition, after the proxy server 25 is controlled to perform the corresponding load distribution, when transmission performance that is of load and that is on the first member transmission path or the second member transmission path restores to a normal level, load backflow occurs, and the first receiver 43 receives again the trigger event reported by the proxy server 25. The first processor 41 controls again the first transmitter 44 to send the request for obtaining the network information to the packet data network gateway PGW 24, obtains the network information fed back by the packet data network gateway PGW 24, and then controls, according to the first transmission delay, the second transmission delay, and the network information, the first transmitter 44 to deliver the control instruction to the proxy server 25, so as to control the proxy server 25 to perform the corresponding load distribution.

When the first transmission delay or the second transmission delay is less than a second delay threshold, the proxy server 25 reports the trigger event again, where the second delay threshold is a threshold value of a time required for the load transmission when the user equipment 21 is controlled to perform load backflow, and the second delay threshold is less than the first delay threshold.

The first processor 41 reconfigures the quality of service parameters that are of the user equipment 21 and that are on the first member transmission path and the second member transmission path, that is, the first processor 41 reconfigures a maximum bit rate MBR, a guaranteed bit rate GBR, or an access point name-aggregate maximum bit rate APN-AMBR that are on the first member transmission path and the second member transmission path by combining the network information, and controls the first transmitter 44 to deliver the quality of service parameters to the packet data network gateway PGW 24, and the quality of service parameters take effect.

Preferably, the first processor 41 controls the proxy server 25 to perform, in a conservative, radical, or switchable manner, the load distribution to implement balance of transmission performance of all member transmission paths.

Further, the first receiver 43 obtains subscription information of the user equipment 21, and the first processor 41 controls, according to the first transmission delay, the second transmission delay, the network information, and the subscription information, the first transmitter 44 to deliver the control instruction to the proxy server 25, so as to control the proxy server 25 to perform the corresponding load distribution. Preferably, the subscription information includes tariffs for transmitting corresponding load on the first member transmission path and the second member transmission path when the user equipment 21 accesses to the first network and the second network. For processes of determining and executing the load distribution solution in this embodiment, refer to the description of the control methods of the load transmission that are in the foregoing first embodiment and the third embodiment, and details are not described herein again.

FIG. 5 is a schematic structural diagram of hardware of a proxy server according to a preferred embodiment of the present invention. Referring to FIG. 5, a proxy server 50 applies to the application scenario shown in FIG. 2. The proxy server 50 includes a second processor 51, a second memory 52, a second receiver 53, and a second transmitter 54, and the second memory 52, the second receiver 53, and the second transmitter 54 are connected to the second processor 51. The second transmitter 54 is configured to report a trigger event to a policy and charging control entity 27, and the second receiver 53 is configured to obtain a first transmission delay of a corresponding first member transmission path when user equipment 21 accesses to a first network, and a second transmission delay of a corresponding second member transmission path when the user equipment 21 accesses to a second network, and receive a control instruction forwarded by the policy and charging control entity 27. The trigger event includes the first transmission delay of the corresponding first member transmission path when the user equipment 21 accesses to the first network and the second transmission delay of the corresponding second member transmission path when the user equipment 21 accesses to the second network. When at least one of the first transmission delay or the second transmission delay is greater than a first delay threshold, the second transmitter 54 reports the trigger event to the policy and charging control entity 27, where the first delay threshold is a threshold value of a time required by the user equipment 21 to perform the load transmission when the user equipment 21 is controlled to perform offloading.

The second memory 52 may be one or more of: a floppy disk, a USB flash drive, a removable hard disk, a read-only memory (ROM), a random access memory (RAM), a magnetic disk, or an optical disc of a computer. The second memory 52 further stores an application program, which is configured for invocation by the second processor 51 to implement load distribution.

By invoking the application program stored in the first memory 52, the second processor 51 executes the following operations: monitor whether at least one of the first transmission delay or the second transmission delay is greater than the first delay threshold, and control the second transmitter 54 to report the trigger event to the policy and charging control entity 27 when at least one of the first transmission delay or the second transmission delay is greater than the first delay threshold. The trigger event is used to instruct the policy and charging control entity 27 to determine a load distribution solution according to the first transmission delay and the second transmission delay that are included in the trigger event, and obtained network information fed back by a packet data network gateway PGW 24, and forward a control instruction to the second receiver 53.

The second processor 51 performs corresponding load distribution under the control of the policy and charging control entity 27. For a specific process and manner of performing the corresponding load distribution in this embodiment, refer to the description in the embodiment shown in FIG. 4, and details are not described herein again.

In addition, after the second processor 51 performs the corresponding load distribution, when transmission performance that is of load and that is on the first member transmission path or the second member transmission path restores to a normal level, load backflow occurs, and the second processor 51 controls the second transmitter 54 to report again the trigger event to the policy and charging control entity 27. The policy and charging control entity 27 initiates the request to the packet data network gateway PGW 24 again, obtains the network information fed back by the packet data network gateway PGW 24, and then determines a corresponding load distribution solution again according to the first transmission delay, the second transmission delay, and the network information, and forwards the control instruction to the second receiver 53. The second processor 51 performs the corresponding load distribution again under the control of the policy and charging control entity 27.

Further, when the second processor 51 controls the second transmitter 54 to report again the trigger event to the policy and charging control entity 27, the trigger event is used to instruct the policy and charging control entity 27 to determine, according to the first transmission delay and the second transmission delay that are included in the trigger event, obtained subscription information of the user equipment 21, and the network information, the corresponding load distribution solution, and forward the control instruction to the second receiver 53. The second processor 51 performs the corresponding load distribution again under the control of the policy and charging control entity 27.

It should be noted that the policy and charging control entity 40 shown in FIG. 4 and the proxy server 50 shown in FIG. 5 are respectively corresponding to the policy and charging control entity 27 and the proxy server 25 that are shown in FIG. 2, that is, the policy and charging control entity 40 and the proxy server 50 correspondingly perform the control methods of the load transmission that are in the foregoing first embodiment, second embodiment, and the third embodiment, and therefore have a same technical effect as the control methods of the load transmission.

Based on the foregoing description, in the embodiments of the present invention, a transmission delay of user equipment on each member transmission path is monitored, so that network information of a network to which each member transmission path is connected may be taken into consideration when a transmission delay is greater than a preset transmission delay threshold, so as to easily determine a cause of deterioration of transmission performance of a congested member transmission path, and instruct the congested member transmission path to execute a specific load distribution solution. Compared with the prior art, a determined load distribution solution for the congested member transmission path is more targeted and more accurate, which can greatly improve service experience of a user.

It should be noted that the foregoing descriptions are merely embodiments of the present invention, and the protection scope of the present invention is not limited thereto. All equivalent structure or process changes made according to the content of the specification and accompanying drawings in the present invention or by directly or indirectly applying the present invention in other related technical fields shall fall within the protection scope of the present invention.

What is claimed is:

1. A control apparatus for load transmission, wherein load is transmitted based on MultiPath Transmission Control Protocol (MPTCP), and the control apparatus comprises:
   a processor; and
   a computer-readable storage medium storing a program to be executed by the processor;
   a receiver, configured to receive a trigger event reported by a proxy server, wherein the trigger event comprises a first transmission delay of a corresponding first member transmission path when user equipment accesses a first network, and comprises a second transmission delay of a corresponding second member transmission path when the user equipment accesses a second network, wherein when at least one of the first transmission delay or the second transmission delay is greater than a first delay threshold, the proxy server reports the trigger event, wherein the first delay threshold is a threshold value of a time required by the user equipment to perform the load transmission when the user equipment is controlled to perform offloading;
   a transmitter, configured to initiate a request for obtaining network information to a packet data network gateway after the receiver receives the trigger event, wherein the network information comprises a quality of service parameter of the first network and a quality of service parameter of the second network;
   wherein the receiver is further configured to obtain the network information fed back by the packet data network gateway; and
   wherein the program includes instructions for controlling, according to the first transmission delay, the second transmission delay, and the network information, the proxy server to perform load distribution.

2. The control apparatus according to claim 1, wherein the receiver is further configured to receive the trigger event reported again by the proxy server, wherein when the first transmission delay or the second transmission delay is less than a second delay threshold, the proxy server reports the trigger event again;
   wherein the second delay threshold is a threshold value of a time required for the load transmission when the user equipment is controlled to perform a load backflow, and the second delay threshold is less than the first delay threshold; and
   wherein the load backflow occurs when transmission performance that is on the first member transmission path or the second member transmission path and that is of the load restores to a normal level, after the proxy server performs the load distribution.

3. The control apparatus according to claim 2, wherein the program further includes instructions for obtaining subscription information of the user equipment, and controlling, according to the first transmission delay, the second transmission delay, the network information, and the subscription information, the proxy server to perform the load distribution, wherein the subscription information comprises tariffs for transmitting a corresponding load on the first member transmission path and the second member transmission path when the user equipment accesses to the first network and the second network.

4. The control apparatus according to claim 1, wherein the program further includes instructions for reconfiguring a quality of service parameter on the first member transmission path and a quality of service parameter on the second member transmission path that correspond to the user equipment, and the quality of service parameters are delivered to the packet data network gateway by the transmitter to control the proxy server to perform the load distribution, wherein the quality of service parameters comprise one or more of a maximum bit rate, a guaranteed bit rate, or an access point name-aggregate maximum bit rate.

5. The control apparatus according to claim 4, wherein the program further includes instructions for controlling the proxy server to perform the load distribution in a conservative, radical, or switchable manner.

6. The control apparatus according to claim 1, wherein the first network is a wireless local area network and comprises a WiFi network, the second network is a cellular network that overlaps coverage of the first network, the cellular network comprises one or a combination of a 2G network, a 3G network, or a 4G network, and the second member transmission path corresponding to the second network is a default path of the load transmission.

7. A control apparatus for load transmission, wherein load is transmitted based on MultiPath Transmission Control Protocol (MPTCP), and the control apparatus comprises:
 a receiver, configured to obtain a first transmission delay of a corresponding first member transmission path when user equipment accesses a first network, and a second transmission delay of a corresponding second member transmission path when the user equipment accesses a second network;
 a processor; and
 a computer-readable storage medium storing a program to be executed by the processor, the program including instructions for:
  monitoring whether at least one of the first transmission delay or the second transmission delay is greater than a first delay threshold, wherein the first delay threshold is a threshold value of a time required by the user equipment to perform the load transmission when the user equipment is controlled to perform offloading; and
 a transmitter, configured to report a trigger event to a policy and charging control entity when at least one of the first transmission delay or the second transmission delay is greater than the first delay threshold, wherein the trigger event instructs the policy and charging control entity to control, according to the first transmission delay and the second transmission delay that are comprised in the trigger event, and obtained network information fed back by a packet data network gateway, the processor to perform load distribution, wherein the network information comprises a quality of service parameter of the first network and a quality of service parameter of the second network.

8. The control apparatus according to claim 7, wherein the transmitter is further configured to report the trigger event to the policy and charging control entity again when the first transmission delay or the second transmission delay is less than a second delay threshold;
 wherein the second delay threshold is a threshold value of a time required for the load transmission when the user equipment is controlled to perform a load backflow, and the second delay threshold is less than the first delay threshold;
 wherein the load backflow occurs when transmission performance that is on the first member transmission path or the second member transmission path and that is of the load restores to a normal level, after the policy and charging control entity controls performing of the load distribution.

9. The control apparatus according to claim 8, wherein the program further includes instructions for performing the load distribution, according to the first transmission delay and the second transmission delay that are comprised in the trigger event, and obtained subscription information of the user equipment, and the network information, and under the control of the policy and charging control entity as instructed by the trigger event, wherein the subscription information comprises tariffs for transmitting corresponding load on the first member transmission path and the second member transmission path when the user equipment accesses to the first network and the second network.

10. The control apparatus according to claim 7, wherein the program further includes instructions for performing, under the control of the policy and charging control entity, the load distribution in a conservative, radical, or switchable manner.

11. The control apparatus according to claim 7, wherein the first network is a wireless local area network and comprises a WiFi network, the second network is a cellular network that overlaps coverage of the first network, the cellular network comprises any combination of a 2G network, a 3G network, or a 4G network, and the second member transmission path corresponding to the second network is a default path of the load transmission.

12. A control method for load transmission, wherein load is transmitted based on MultiPath Transmission Control Protocol, and the control method comprises:
 receiving a trigger event reported by a proxy server, wherein the trigger event comprises a first transmission delay of a corresponding first member transmission path when user equipment accesses a first network, and comprises a second transmission delay of a corresponding second member transmission path when the user equipment accesses a second network, wherein when at least one of the first transmission delay or the second transmission delay is greater than a first delay threshold, the proxy server reports the trigger event, wherein the first delay threshold is a threshold value of a time required by user equipment to perform the load transmission when the user equipment is controlled to perform offloading;
 initiating a request for obtaining network information to a packet data network gateway, and obtaining the network information fed back by the packet data network gateway, wherein the network information comprises a quality of service parameter of the first network and a quality of service parameter of the second network; and
 controlling, according to the first transmission delay, the second transmission delay, and the network information, the proxy server to perform corresponding load distribution.

13. The control method according to claim 12, wherein after the controlling the proxy server to perform corresponding load distribution, when transmission performance that is on the first member transmission path or the second member transmission path and that is of the load restores to a normal level, load backflow occurs, and the control method further comprises:
 receiving the trigger event reported again by the proxy server, wherein when the first transmission delay or the second transmission delay is less than a second delay threshold, the proxy server reports the trigger event again, wherein the second delay threshold is threshold value of a time required for the load transmission when the user equipment is controlled to perform the load backflow, and the second delay threshold is less than the first delay threshold.

14. The control method according to claim 12, further comprising:
 obtaining subscription information of the user equipment, wherein the subscription information comprises tariffs for transmitting corresponding load on the first member transmission path and the second member transmission path when the user equipment accesses to the first network and the second network;

wherein controlling the proxy server to perform load distribution further comprises:

controlling, according to the first transmission delay, the second transmission delay, the network information, and the subscription information, the proxy server to perform the load distribution.

15. The control method according to claim 12, wherein controlling the proxy server to perform load distribution comprises:

reconfiguring the quality of service parameter on the first member transmission path and the quality of service parameter on the second member transmission path that correspond to the user equipment, and delivering the quality of service parameters to the packet data network gateway, wherein the quality of service parameters comprise at least one of a maximum bit rate, a guaranteed bit rate, or an access point name-aggregate maximum bit rate.

16. The control method according to claim 15, wherein controlling the proxy server to perform load distribution further comprises:

controlling the proxy server to perform load distribution in a conservative, radical, or switchable manner.

17. The control method according to claim 12, wherein the first network is a wireless local area network and comprises a WiFi network, the second network is a cellular network that overlaps coverage of the first network, the cellular network comprises one or any combination of a 2G network, a 3G network, or a 4G network, and the second member transmission path corresponding to the second network is a default path of the load transmission.

* * * * *